(12) United States Patent
Moore et al.

(10) Patent No.: US 7,679,493 B1
(45) Date of Patent: Mar. 16, 2010

(54) BOAT TRAILER SUBMERSION

(75) Inventors: Daniel D Moore, Canton, MI (US); Alain H Grenier, Ann Arbor, MI (US)

(73) Assignee: Yazaki North America, Inc., Canton, MI (US)

(*) Notice: Subject to any disclaimer, the term of this patent is extended or adjusted under 35 U.S.C. 154(b) by 285 days.

(21) Appl. No.: 12/017,129

(22) Filed: Jan. 21, 2008

(51) Int. Cl.
G08B 21/00 (2006.01)

(52) U.S. Cl. .................................... 340/431
(58) Field of Classification Search ............. 340/431, 340/438, 453, 458, 468, 479; 307/10.8
See application file for complete search history.

(56) References Cited

U.S. PATENT DOCUMENTS

| | | | |
|---|---|---|---|
| 3,821,560 A * | 6/1974 | Hansen | 307/10.1 |
| 3,821,669 A | 6/1974 | Wuerffel | |
| 3,840,852 A | 10/1974 | Schwellenbach | |
| 3,965,456 A | 6/1976 | Schwellenbach | |
| 4,620,109 A | 10/1986 | Kummer | |
| 4,809,177 A | 2/1989 | Windle et al. | |
| 5,285,113 A | 2/1994 | Schlich | |
| 5,397,924 A | 3/1995 | Gee et al. | |
| 5,491,383 A | 2/1996 | Leiber et al. | |
| 5,596,233 A | 1/1997 | Leiber et al. | |
| 5,693,985 A | 12/1997 | Gee et al. | |
| 5,719,552 A | 2/1998 | Thompson | |
| 5,805,061 A | 9/1998 | Fritz et al. | |
| 6,069,559 A | 5/2000 | Davis et al. | |
| 6,130,487 A | 10/2000 | Bertalan et al. | |
| 6,218,952 B1 | 4/2001 | Borland et al. | |
| 6,501,376 B2 | 12/2002 | Dieckmann et al. | |
| 6,525,654 B1 | 2/2003 | Siggers | |
| 6,535,113 B1 | 3/2003 | Gravolin | |
| 6,642,628 B2 | 11/2003 | Burdick et al. | |
| 6,909,363 B2 | 6/2005 | Bell et al. | |
| 7,052,031 B2 | 5/2006 | Gravolin | |
| 7,064,658 B2 | 6/2006 | Burlak et al. | |
| 7,106,182 B2 | 9/2006 | De Wilde | |
| 7,113,078 B2 * | 9/2006 | Young | 340/431 |

(Continued)

OTHER PUBLICATIONS http://www.centrevilletrailer. com/news-notices/surgebrake-troubleshootingtips.htm; "Surge Brake Troubleshooting Tips", pp. 1-6 (Aug. 2, 2007).

*Primary Examiner*—Phung Nguyen
(74) *Attorney, Agent, or Firm*—Harness, Dickey & Pierce, P.L.C.

(57) ABSTRACT

A method of controlling a surge brake mechanism and all lights on a trailer connected to a vehicle that can submerse the trailer to deploy a boat into water. The method generally includes monitoring the vehicle for vehicle conditions that include at least a speed of the vehicle and a direction in which the vehicle is moving. The method waits for user input from within a passenger compartment of the vehicle that is indicative of a desire to disable all of the lights and the surge brake mechanism on the trailer. The method determines a boat launch condition exists when at least one enabling input is detected and determines the boat launch condition does not exist when any disabling input is detected. The method disables the surge brake mechanism and all of the lights on the trailer, when the boat launch condition exists and enables the surge brake mechanism and all of the lights on the trailer, when the boat launch condition does not exist.

20 Claims, 8 Drawing Sheets

U.S. PATENT DOCUMENTS

2004/0160123 A1 8/2004 Burdick et al.
2005/0017856 A1 1/2005 Peterson
2005/0275288 A1* 12/2005 Miller ...................... 307/10.1

* cited by examiner

BOAT TRAILER SUBMERSION

FIELD

The present teachings relate to backing a trailer with lights and a surge brake and more particularly relate to disabling all of the lights on the trailer and disabling the surge brake before the trailer enters the water without a need for a user to exit a vehicle.

BACKGROUND

Typically backing a boat trailer into water requires a user to manually disconnect the lights on the trailer to protect the trailer lights and avoid fuse blows on the vehicle, due to ingress or exposure to the water. In some instances, the extinguishing of the lights on the trailer does not disable the surge brake, which can make it more difficult to back the trailer. The user typically exits the vehicle to manually disconnect all of the lights on the trailer and manually disable the surge brake.

SUMMARY

The present teachings generally include a method of controlling a surge brake mechanism and all lights on a trailer connected to a vehicle that can submerse the trailer to deploy a boat into water. The method monitors the vehicle for vehicle conditions that include at least a speed of the vehicle and a direction in which the vehicle is moving. The method waits for user input from within a passenger compartment of the vehicle that is indicative of a desire to disable all of the lights and the surge brake mechanism on the trailer. The method determines a boat launch condition exists when at least one enabling input is detected and determines the boat launch condition does not exist when any disabling input is detected. The method disables the surge brake mechanism and all of the lights on the trailer, when the boat launch condition exists and enables the surge brake mechanism and all of the lights on the trailer, when the boat launch condition does not exist.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings.

DETAILED DESCRIPTION

The following description is merely exemplary in nature and is not intended to limit the present teachings, their application or uses. It should be understood that throughout the drawings, corresponding reference numerals can indicate like or corresponding parts and features. As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electromechanical components that can provide the described functionality and/or combinations thereof.

Figure 1:
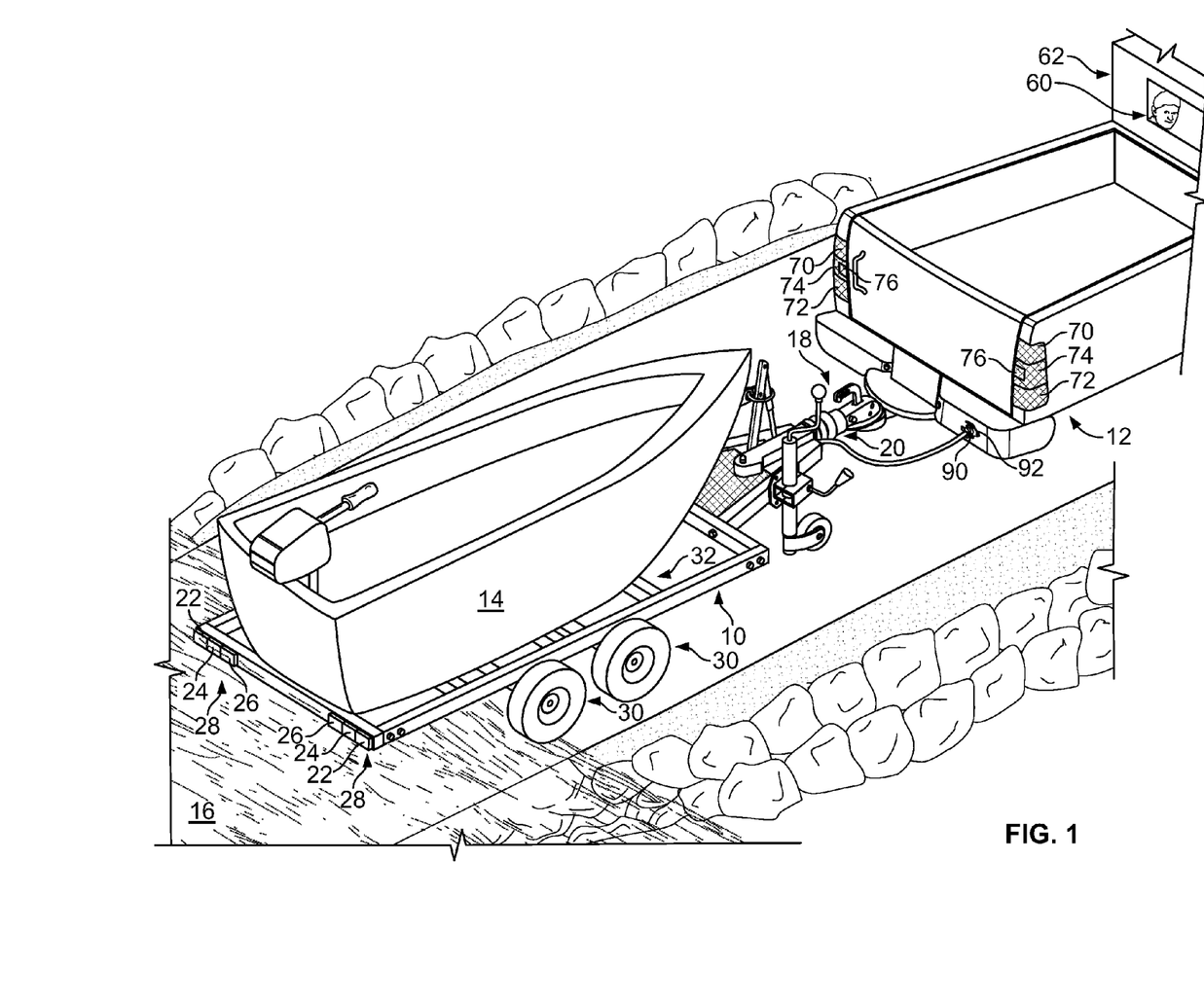
FIG. 1 is a partial perspective view of a vehicle connected to a trailer having a surge brake mechanism and trailer lights constructed in accordance with the present teachings.

With reference to FIG. 1, a trailer 10 can be connected to a vehicle 12 so as to trailer a boat 14 and to deploy the boat 14 into water 16. Deploying the boat 14 into the water 16 can require a portion of the trailer 10 to be submersed into the water 16. To that end, the trailer 10 can connect to the vehicle 12 using a hitch 18 so that the trailer 10 can be pulled and pushed by and pivoted about the vehicle 12.

The trailer 10 can include a surge brake mechanism 20 to help slow the trailer 10 while braking the vehicle 12. The trailer 10 can also include running lights 22, brake lights 24 and turn lights 26 that can be collectively referred to as trailer lights 28. One or more of the trailer lights 28 can be submersed into the water 16 when the boat 14 is deployed therein. The trailer lights 28 can each be selectively activated in response to signals from the vehicle 12.

The surge brake mechanism 20, when enabled, can slow the trailer 10 as the vehicle 12 slows because the surge brake mechanism 20 can compress brake fluid to activate brakes associated with each of the wheels 30 on the trailer 10. A portion of a frame 32 of the trailer 10 can move relative to other portions of the frame 32 and the relative motion between the two can serve to compress the brake fluid. As such, when the vehicle 12 slows and as the trailer 10 begins to overtake the vehicle 12 (i.e., surge), the surge brake mechanism 20 can apply the brakes on the trailer 10. It will be appreciated in light of the disclosure that the surge brake mechanism 20, when enabled, can make backing the trailer 10 more difficult. It will also be appreciated in light of the disclosure that the brakes on the trailer 10 and the surge brake mechanism 20 need not be hydraulic systems but in some instances can be electric, pneumatic, etc.

The running lights 22, the brake lights 24 and the turn lights 26 can extend from the frame 32 of the trailer 10. Each of the trailer lights 28 can be provided in a single housing, in multiple housings and one or more combinations thereof that can be arranged around the trailer 10. When the trailer 10 is backed into the water 16, the running lights 22, the brake lights 24 and the turn lights 26 can be extinguished so no power is delivered to any of the trailer lights 28. By not delivering any power to the trailer lights 28, the trailer lights 28 can be protected from exposure to the water 16. Exposure to the water 16 can, in some instances, cause the water 16 to enter one or more of the housings mentioned above. The water 16 can then cause the one or more trailer lights 28 (or fuses therefor) to possibly fail (e.g., blow) due to cracking of the bulb, a short-circuit across a connection for the bulb, etc.

Figure 2:
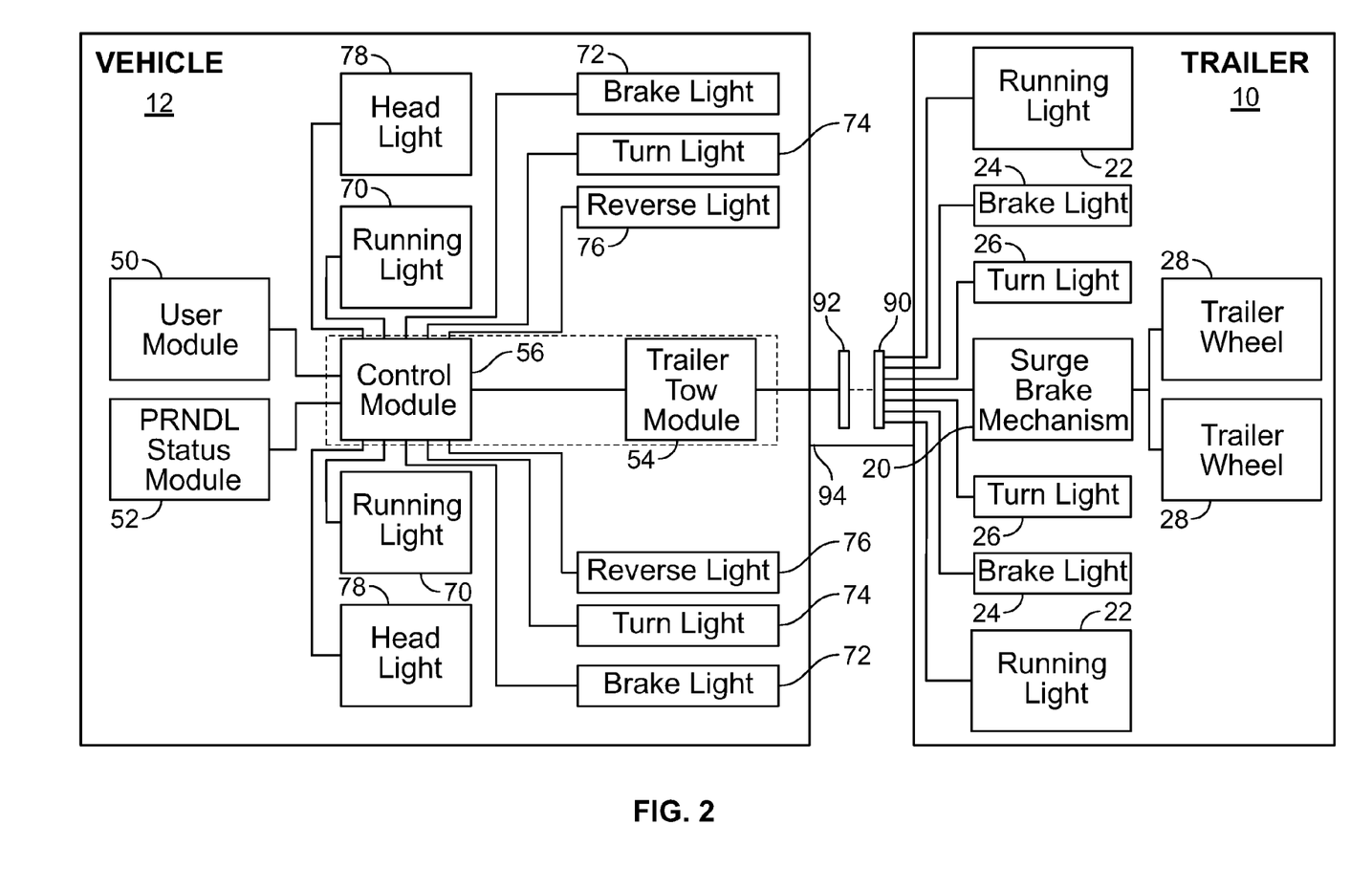
FIG. 2 is a diagram of the vehicle, the trailer and connections therebetween in accordance with the present teachings.

With reference to FIG. 2, the vehicle 12 can include a user module 50, a PRNDL status module 52 and a trailer tow module 54 that can each be connected to (or included within) a control module 56. The control module 56 can communicate with the user module 50, the PRNDL status module 52 and the trailer tow module 54 over a suitable communications network such as a CAN or a LIN network or can communicate using one or more analog signals. The trailer tow module 54 can determine whether a boat launch condition exists.

When the trailer tow module 54 determines that the boat launch condition exists, the trailer tow module 54 can extinguish the running lights 22, the brake lights 24 and/or the turn lights 26 on the trailer 10. The trailer tow module 54 can also (alone or in combination) disable the surge brake mechanism 20 with an electrical signal to the trailer 10 that can be configured to illuminate reverse lights on a trailer when so equipped. This can be accomplished in accordance with the present teachings without the need for the user to exit the vehicle 12 to, for example, disconnect the trailer 10 from the vehicle 12 and manually disable the surge brake mechanism 20 in a conventional manner.

In one aspect of the present teachings, the trailer tow module 54 can be configured to send information to a user 60 as the trailer tow module 54 determines whether the boat launch condition exists. The information can, for example, be a request for a confirmation from the user 60. The user 60 can be in a passenger compartment 62 of the vehicle 12. When the confirmation from the user 60 (i.e., the user input) is received, the trailer tow module 54 can determine that the boat launch condition exists. Regardless of how the boat launch condition is determined to exist, the user 60 need not exit the vehicle 12 to manually disconnect the trailer lights 28 and manually disable the surge brake mechanism 20 on the trailer 10.

It will be appreciated in light of the disclosure that the trailer tow module 54 in accordance with various aspects of the present teachings can determine that the boat launch condition exists based on one or more user inputs, one or more vehicle conditions and one or more combinations thereof. When the boat launch condition exists, the trailer tow module 54 can disable all of the trailer lights 28 and the surge brake mechanism 20 on the trailer 10. When the boat launch condition does not exist, the trailer tow module 54 can enable all of the trailer lights 28 and enable the surge brake mechanism 20.

When the trailer tow module 54 detects one or more vehicle conditions that can indicate whether the launch condition exists, the trailer tow module 54 can seek confirmation from the user 60 before making the ultimate determination of whether the boat launch condition exists. When the trailer tow module 54 receives one or more user inputs indicative of the desire to disable the trailer lights 28 and the surge brake mechanisms 20, the trailer tow module 54—unless it receives a disabling input—can determine the boat launch condition exists and therefore disable the trailer lights 28 and the surge brake mechanisms 20. In this example, the trailer tow module 54 can determine that the boat launch condition exists based on a combination of one or more user inputs and vehicle conditions.

Information directed to the user 60 can include the indication seeking confirmation—that when responded to—can be interpreted as the user 60 agreeing to disable all of the trailer lights 28 and the surge brake mechanism 20 on the trailer 10. The indication from the user module 50 requesting such confirmation from the user 60 can be in the form of one or more symbols, lights, messages, chimes, tactile sensations, portions of a heads-up display, etc. In one example, a terminal (or display, etc., as equipped) associated with the user module 50 can be within the passenger compartment 62 of the vehicle 12 and can be accessible to one or more users 60 within the vehicle 12. The user module 50 via the terminal can indicate to the user 60 whether the boat launch condition exists. The user module 50 can also indicate various messages, indications, and/or other information from the trailer tow module 54, the control module 56 and/or other systems of the vehicle 12 including information in the form suitable to solicit a user confirmation when determining whether the boat launch condition exists.

The PRNDL status module 52 can determine and can indicate to the control module 56 and/or the trailer tow module 54 the current gear in which the vehicle 12 is engaged. For example, the vehicle 12 can have an automatic transmission that can be switched to a drive gear. In this example, the PRNDL status module 52 determines that the vehicle 12 is in a forward gear. "PRNDL" refers to "Park" "Reverse" "Neutral" "Drive," and "Low" positions of an automatic transmission. It will be appreciated in light of the disclosure, however, that the vehicle 12 can have one or more transmissions and the PRNDL status module 52 can determine and indicate whether the vehicle 12 is in neutral, a forward gear (or gear ratio), a backward gear (or gear ratio) or whether the parking lock (if so equipped) is applied. Further, the PRNDL status module 52 can determine if a hand or foot parking brake (if so equipped) is applied (not specifically shown).

The vehicle 12 can include, for example, running lights 70, brake lights 72, turn lights 74, reverse lights 76 and head lights 78, which can be collectively referred to as vehicle lights 80. The vehicle lights 80 can be controlled by various systems within the vehicle 12 and by the user 60.

A connector 90 can extend from the trailer 10 and can connect to a connector 92 that can extend from the vehicle 12. A physical connection 94 can connect the trailer 10 to the vehicle 12, e.g., via the hitch 18. By having the connectors 90 and 92 connected to one another, one or more of the vehicle lights 80 illuminated on the vehicle 12 can also be similarly illuminated on the trailer 10. Specifically, by illuminating the running lights 70, the brake lights 72 and the turn lights 74 on the vehicle 12 the running lights 22, the brake lights 24 and the turn lights 26, respectively, can be activated. By turning certain lights 80 off on the vehicle 12, corresponding lights 28 on the trailer 10 can also be extinguished. As noted above, the trailer 10, in certain examples, does not have reverse lights, so that the reverse lights 76 on the vehicle 12 do not illuminate any reverse lights on the trailer 10.

In various aspects of the present teachings, the surge brake mechanism 20 can be disabled when the surge brake mechanism 20 receives the electrical signal to the trailer 10 that would have illuminated reverse lights on a trailer if so equipped. It will be appreciated in light of the disclosure that many trailers including the trailer 10 lack reverse lights. The trailer 10, therefore, receives the reverse light signal to disable the surge brake mechanism 20. When the surge brake mechanism 20 does not receive the reverse light signal sent to the trailer 10, the surge brake mechanism 20 can be enabled.

In one example, the surge brake mechanism 20 can include a solenoid (not shown) that when energized can extend to physically obstruct the movement of a portion of the surge brake mechanism 20 to, among other things, inhibit the surge brake mechanism 20 from compressing the brake fluid to apply the brakes on the trailer 10. As such, when the reverse lights 76 on the vehicle 12 are turned on and the reverse light signal is sent through the connectors 90 and 92, the surge brake mechanism 20, in this example, can be disabled with the solenoid. When the boat launch condition exists, the trailer tow module can extinguish all of the trailer lights 28 on the trailer 10 but can continue to send the reverse light electrical signal from the vehicle 12 through the connectors 90 and 92 to the surge brake mechanism 20. The reverse light signal can disable the surge brake mechanism 20, while, for example, backing the trailer 10 and ultimately deploying the boat 14 into the water 16. The above can be accomplished without the need for the user 60 to exit the vehicle 12.

In one aspect of the present teachings, the trailer tow module 54 can determine that the boat launch condition exists when the user 60 in the passenger compartment 62 indicates to the trailer tow module 54 via the user module 50 the desire to disable the trailer lights 28 and the surge brake mechanism 20 on the trailer 10. For example, the user 60 can press a button associated with the user module 50 (or the terminal connected thereto) so that the trailer tow module 54 can interpret such input as user input requesting that the trailer tow module 54 make the ultimate determination that the boat launch condition exists. Unless the trailer tow module 54 receives one or more disabling inputs, the trailer tow module 54 will determine the boat launch condition exists and disable the trailer lights 28 and the surge brake mechanism 20 on the trailer 10 until one or more of the disabling inputs are detected. In this example, the user input (i.e., the button pressed by the user 60) is only enabling input that the trailer tow module 54 receives and no vehicle conditions are relied upon in this example.

By way of the above example, one disabling input can include one or more user inputs. A disabling user input can include the user 60 requesting via the user module 50 that the trailer lights 28 and the surge brake mechanism 20 be enabled (or prevent being disabled). Another example of a disabling input can be one or more vehicle conditions that can define the vehicle 12 having a forward speed in excess of a high speed threshold (e.g., five miles per hour). A further example of disabling input can be one or more vehicle conditions defining the vehicle 12 moving in any direction at a speed in excess of a high speed threshold (e.g., ten miles per hour). The trailer tow module 54 can therefore determine that the boat launch condition exists when the user 60 indicates the desire to determine the boat launch condition exists and no disabling inputs are detected.

In accordance with a further aspect of the present teachings, the trailer tow module 54 can determine that the boat launch condition exists based on one or more enabling inputs. The one or more enabling inputs can be one or more vehicle conditions indicative of the boat launch condition in combination with the confirmation of the boat launch condition from the user 60 via the user module 50 in the passenger compartment 62. In this regard, the user 60 can confirm that the trailer tow module 54 should disable the trailer lights 28 and the surge brake mechanism 20 on the trailer 10 based on detected vehicle conditions and the absence of any of the disabling inputs.

For example, one or more vehicle conditions indicative of the boat launch condition can define the vehicle 12 being in a reverse gear (or gear ratio) and moving at a speed that is less than a low speed threshold (e.g., five miles per hour). In this example, when the above one or more vehicle conditions are detected, the trailer tow module 54 can determine that the boat launch condition exists when the confirmation is obtained from the user 60 via the user module 50 and no disabling inputs are detected. In this regard, the confirmation from the user 60 (i.e., one or more user inputs) can serve to verify and confirm the determination that the boat launch condition exists based on the detected one or more vehicle conditions.

In another example, one or more vehicle conditions indicative of the boat launch condition can define the vehicle 12 moving in any direction but at a speed that is less than a low speed threshold, (e.g., five miles per hour). In a further example, one vehicle condition indicative of the boat launch condition can define the vehicle 12 moving in any direction but at a speed that is less than a low speed threshold (e.g., ten miles per hour) and moving at the speed for a duration greater than ten seconds (i.e., a threshold period). In the above examples, when the one or more vehicle conditions indicative of the boat launch condition is detected, the trailer tow module 54 can determine that the boat launch condition exists when the confirmation is obtained from the user 60 via the user module 50 and no disabling inputs are detected.

Figure 3A:
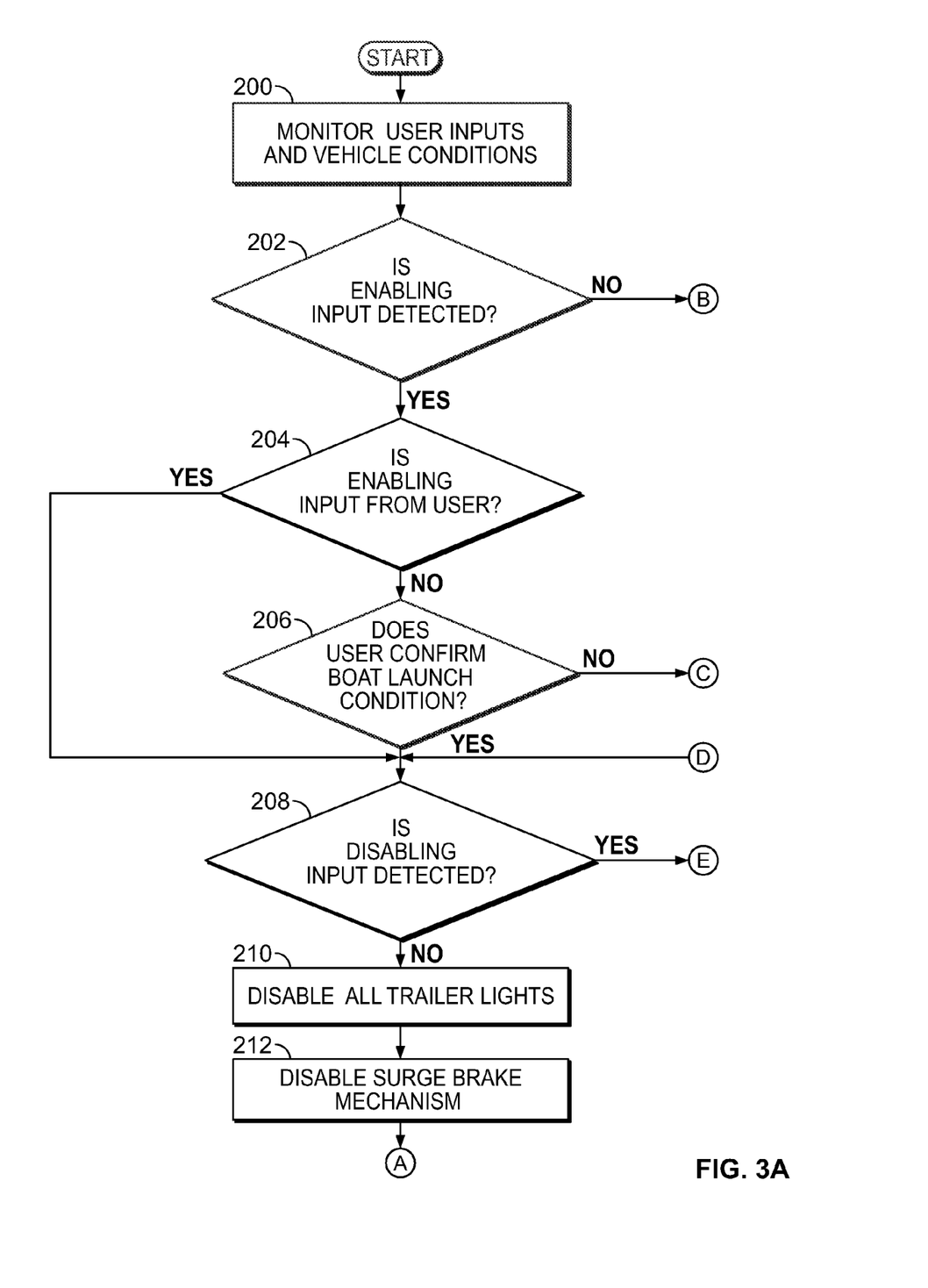
FIGS. 3A and 3B are a flow chart of an exemplary method of disabling and enabling the surge brake mechanism and lights on the trailer in accordance with the present teachings.
Figure 3B:
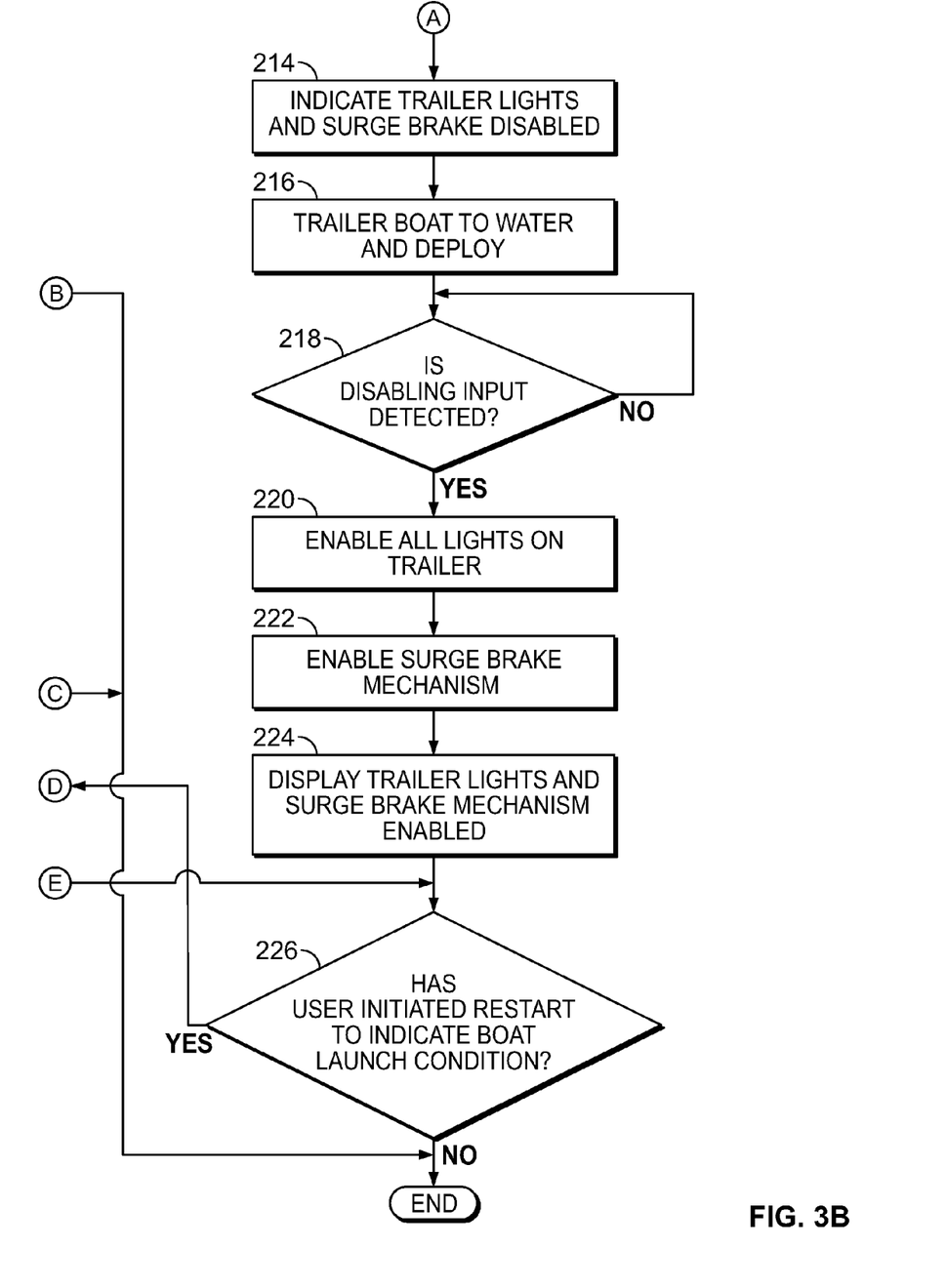

With reference to FIGS. 3A and 3B, an exemplary method is shown that can determine whether the boat launch condition exists. In box 200, one or more of the vehicle conditions of the vehicle 12 (FIG. 2) and/or one or more user inputs from the user 60 (FIG. 1) therein can be monitored. In box 202, it can be determined whether the one or more vehicle conditions and/or one or more user inputs from box 200 are enabling inputs and thus indicative of the boat launch condition. When one or more enabling inputs are detected, the method can continue with box 204. When no enabling inputs are detected, the method can end.

In box 204, it can be determined whether one or more of the enabling inputs are from the user 60 via the user module 50 (FIG. 2). When the enabling input is from the user 60 via the user module 50, the method can continue with box 208. When the enabling input is not from the user 60, the method can continue with box 206. In box 206, it can be determined whether the user 60 has confirmed the boat launch condition via the user module 50. In this regard, confirming the boat launch condition can include indicates that the trailer tow module 54 should disable the trailer lights 28 and the surge brake mechanism 20 (FIG. 2). When the user 60 has confirmed the boat launch condition, the method can continue with box 208. When no confirmation is obtained from the user, the method can end. As such, the trailer tow module 54 (FIG. 2) can be configured to not disable the trailer lights 28 (FIG. 2) and the surge brake mechanism 20 without some sort of input or confirmation from the user 60. It will be appreciated in light of the disclosure that the trailer tow module 54 can be configured to not disable the trailer lights 28 (FIG. 2) and the surge brake mechanism 20 without any input or confirmation from the user 60 and solely based on vehicle conditions.

In box 208, it can be determined whether there is one or more disabling inputs detected that will prevent the ultimate determination that the boat launch condition exists. When there are one or more disabling inputs detected, the method can continue with box 226. When there are no disabling inputs detected, the method can continue with box 210. In box 210, the method can determine that the boat launch condition exists and can therefore disable all of the trailer lights 28 on the trailer 10 (FIG. 2). In box 212, the method can, again in response to the existence of the boat launch condition, disable the surge brake mechanism 20 (FIG. 2).

In box 214, the user module 50 can indicate to the user 60 that the trailer lights 28 are disabled and the surge brake mechanism 20 is disabled (FIG. 2). In box 216, the user 60 can, for example, trailer the boat 14 into the water 16 (FIG. 1) and deploy the boat 14. In box 218, it can be determined whether one or more disabling inputs have been detected. When one or more disabling inputs have not been detected, the method can loop back and continue with box 218. When one or more disabling inputs are detected, the method can continue with box 220. In this regard, the method can wait for disabling input to indicate that the boat launch condition no longer exists and/or whether there is a specific need to enable the trailer lights 28 and the surge brake mechanism 20 (FIG. 2).

In box 220, all of the trailer lights 28 on the trailer 10 (FIG. 2) can be enabled. In box 222, the surge brake mechanism 20 (FIG. 2) can be enabled. In box 224, the user module 50 (FIG. 2) can display that the trailer lights 28 are enabled and the surge brake mechanism 20 is enabled.

In box 226, it can be determined whether the user 60 (FIG. 1) via the user module 50 has optionally initiated a restart and indicated the desire to disable the trailer lights 28 on the trailer 10 and disable the surge brake mechanism 20. When the user has initiated the restart, the method can loop back and continue with box 208. When the user has not initiated the restart, the method can end. During deployment of the boat 14 (FIG. 1), the trailer tow module 54 (FIG. 2) can detect one or more disabling inputs and when it does, the trailer tow module 54 can enable the trailer lights 28 and the surge brake mechanism 20 on the trailer 10 (FIG. 2). The user 60 (FIG. 1) may not, however, be done deploying the boat 14. In this instance, the user 60 can request the restart via the user module 50 (FIG. 2) and once again indicate the desire to disable the trailer lights 28 and the surge brake mechanism 20 on the trailer 10. The user 60 may have corrected one or more issues that may have produced the disabling inputs and may specifically request a restart to automatically disable the trailer lights 28 and the surge brake mechanism 20 via the trailer tow module 54.

Figure 4A:
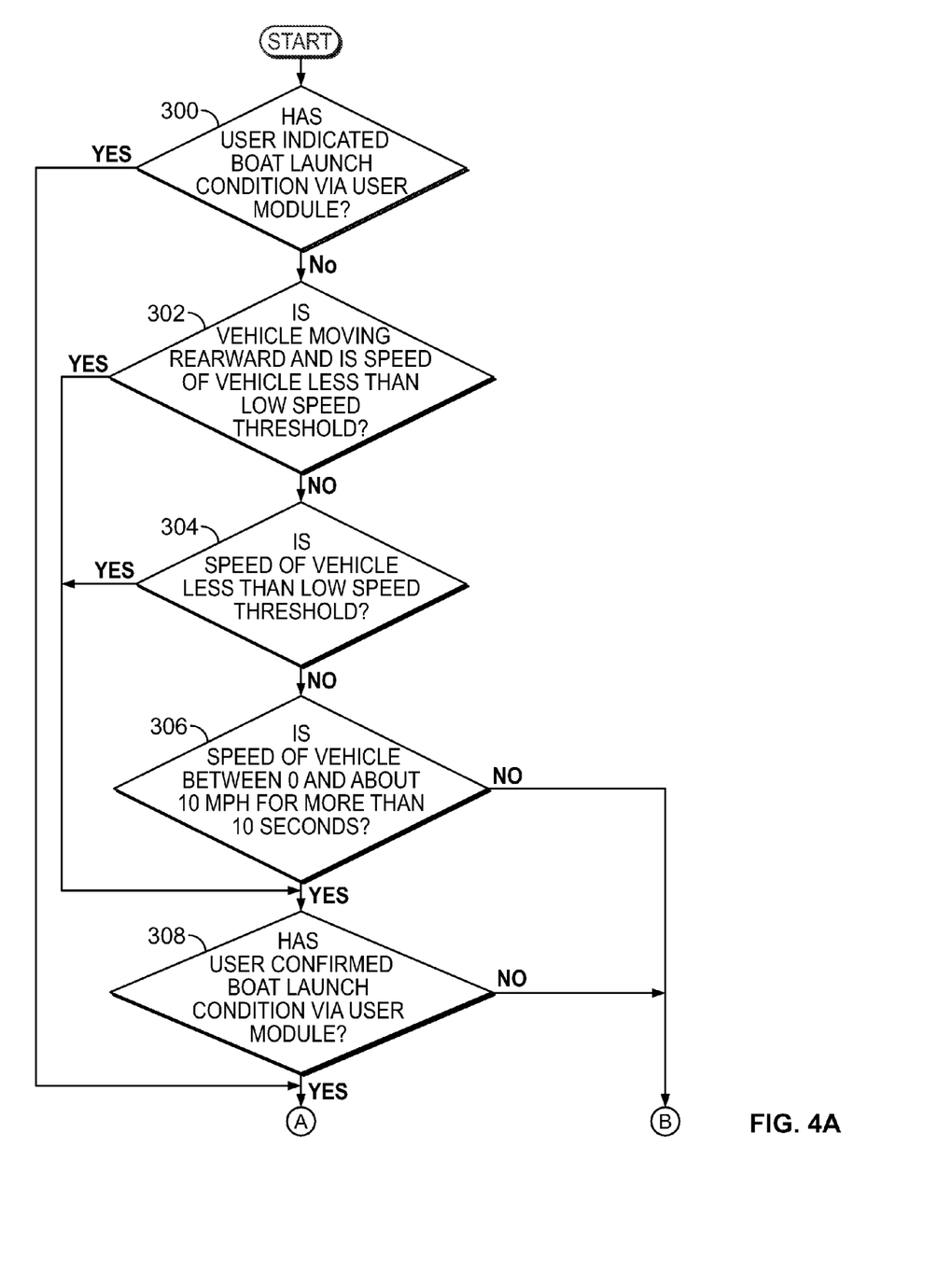
FIGS. 4A and 4B are a flow chart of an exemplary method of determining whether a boat launch condition exists based on one or more vehicle conditions and/or user inputs in accordance with the present teachings.
Figure 4B:
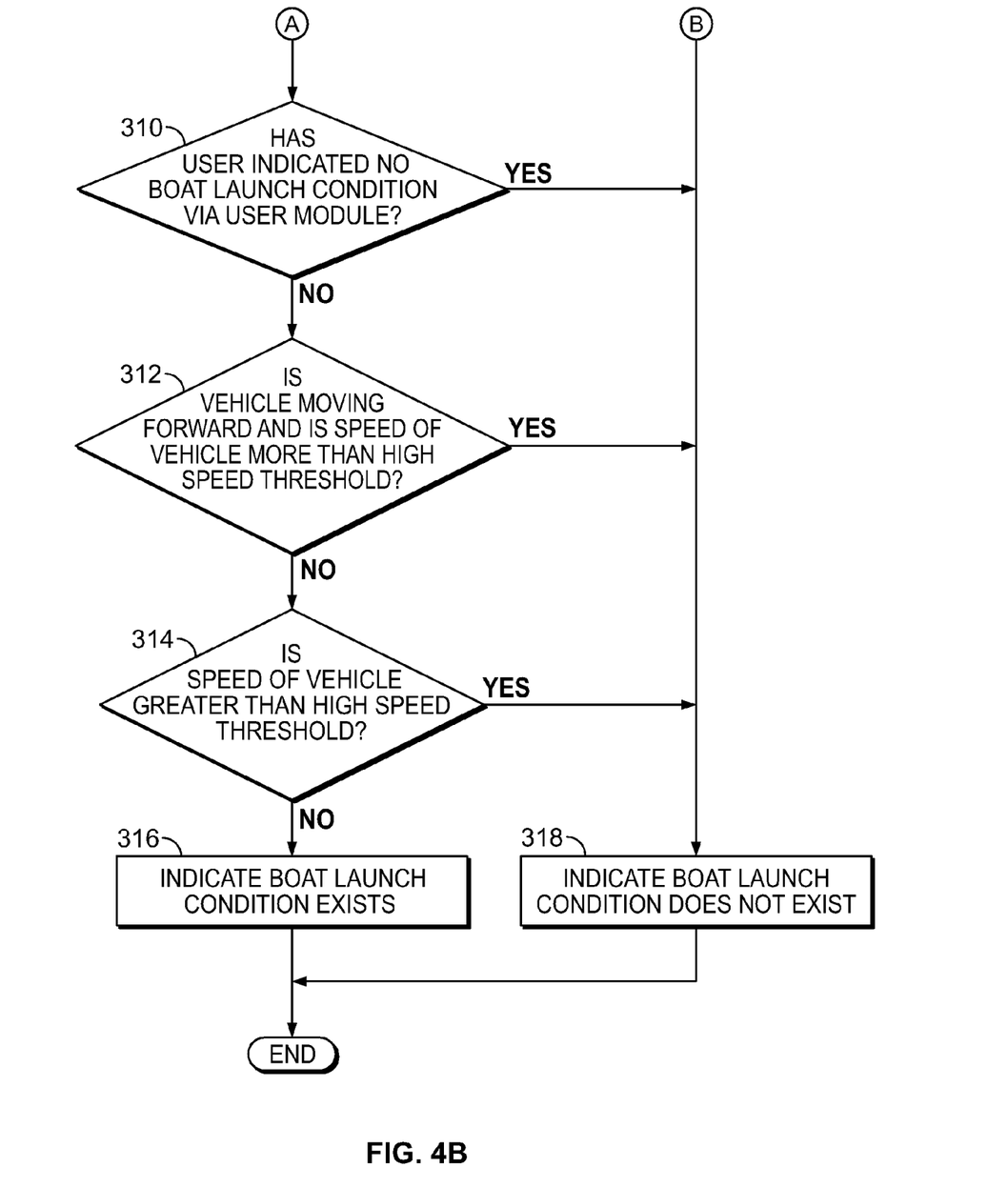

With reference to FIGS. 4A and 4B, an exemplary method is shown that can determine whether a boat launch condition exists based on one or more user inputs and/or vehicle conditions. In box 300, it can be determined whether the user 60 (FIG. 1) has indicated the desire to disable the trailer lights 28 and the surge brake mechanism 20 on the trailer 10 via the user module 50 (FIG. 2). When the user 60 has indicated the above desire via the user module 50, the method can continue with box 310. When the user has not indicated the above desire with the user module 50, the method can continue with box 302. In box 302, it can be determined whether the vehicle 12 (FIG. 2) is moving rearward and the speed of the vehicle 12 is less than a low speed threshold. When the vehicle 12 is moving rearward and the speed of the vehicle 12 is less than the low speed threshold, the method can continue with box 308. When it is determined that the vehicle 12 is neither moving rearward nor traveling at the speed that is in excess of the low speed threshold, the method can continue with box 304.

In box 304 it can be determined whether the speed of the vehicle 12 (FIG. 2) is less than the low speed threshold. When the speed of the vehicle 12 is less than a low speed threshold, the method can continue with box 308. When the speed of the vehicle 12 is in excess of the low speed threshold, the method can continue with box 306. In box 306, it can be determined whether the speed of the vehicle 12 is between zero miles an hour and about ten miles an hour for a period in excess of about ten seconds. When the speed of the vehicle 12 is between zero and ten miles in excess of ten seconds, the method can continue with box 308. When the speed of the vehicle 12 is not within the range of zero to about ten miles an hour, the method can continue with box 318.

In box 308, it can be determined whether the user 60 (FIG. 1) has confirmed the desire to disable the trailer lights 28 and the surge brake mechanism 20 on the trailer 10 (FIG. 2). When the user 60 confirms the above desire, the method can continue with box 318. When the user 60 does not provide the confirmation, the boat launch condition can be determined not to exist and the method can continue with box 310. In box 310, it can be determined whether the user 60 has indicated via the user module 50 (FIG. 2) that no boat launch condition exists and the trailer lights 28 and the brake surge mechanism 20 on the trailer 12 should therefore remain enabled. When the user 60 has indicated via the user module 50 that no boat launch condition exists (or the desire that no boat launch condition exists), the method can continue with box 318. When there has been no such indication by the user 60, the method can continue with box 312.

In box 312, it can be determined whether the vehicle 12 (FIG. 2) is moving forward and the speed of the vehicle 12 is greater than a high speed threshold. When the vehicle 12 is determined to be moving forward and the vehicle speed is in excess of the high speed threshold, the method can continue with box 318. When the vehicle 12 is not moving forward or the vehicle speed is in excess of the high speed threshold, the method can continue with box 314. In box 314, it can be determined whether the speed of the vehicle 12 is greater than the high speed threshold. When the speed of the vehicle 12 is greater than the high speed threshold, the method can continue with box 318. When the speed of the vehicle 12 is less than the high speed threshold, the method can continue with box 316. In box 316, there can be an indication that the boat launch condition exists. In box 318, there can be an indication that the boat launch condition does not exist. From box 316 or from box 318, the method can end.

With reference to FIG. 2, the connecter 90 that can extend from the trailer 10 and the connector 92 that can extend from the vehicle 12 can be implemented with various amounts of terminals and with various configurations. For example and with reference to FIG. 5, a connector 400 from a vehicle 402 can connect to a connecter 404 from a trailer 406. Each of the connectors 400, 404 can have four terminals: a first terminal 410, a second terminal 412, a third terminal 414 and a fourth terminal 416. The first terminal 410 can provide for the control of the stop and turn lights on a left side of the trailer 406. The second terminal 412 can provide for the control of the stop and turn lights on a right side of the trailer 406. The third terminal 414 can provide for the running lights on the trailer 10 such as running lights 22 on the trailer 406. The fourth terminal 416 can provide ground. In this example, the trailer 406 has no electrical connection via the connectors 400 and 404 through which to provide any reverse light signal.

Figure 5:
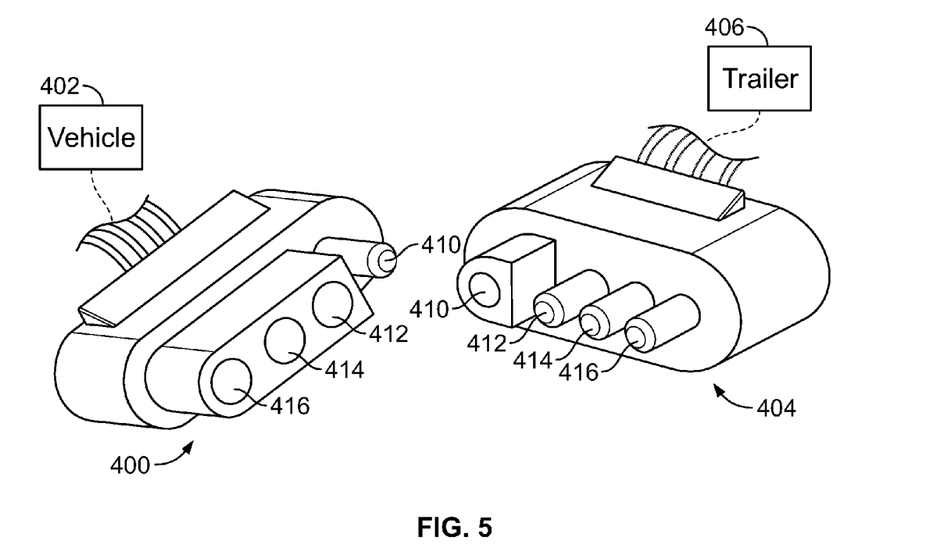
FIG. 5 is a diagram of an exemplary connecter for the trailer that can connect to a complementary connecter for the vehicle each having a four terminal configuration in accordance with the present teachings.

With reference to FIGS. 2 and 5, the connectors 400 and 404 can be implemented with the vehicle 12 and the trailer 10 but no signal can be transmitted to the surge brake mechanism 20 through the connectors 400 and 404. Nevertheless, the first terminal 410 and the second terminal 412 can provide power to enable and disable the brake lights 24 and the turn lights 26 on the trailer 10. The third terminal 414 can provide power to enable and disable the running lights 22. As such, the trailer tow module 54 can only turn off the trailer lights 28 through the exemplary connectors 400 and 404. The surge brake mechanism 20, while still controllable via the trailer tow module 54, would, in this example, be connected thereto via separate connectors.

Figure 6:
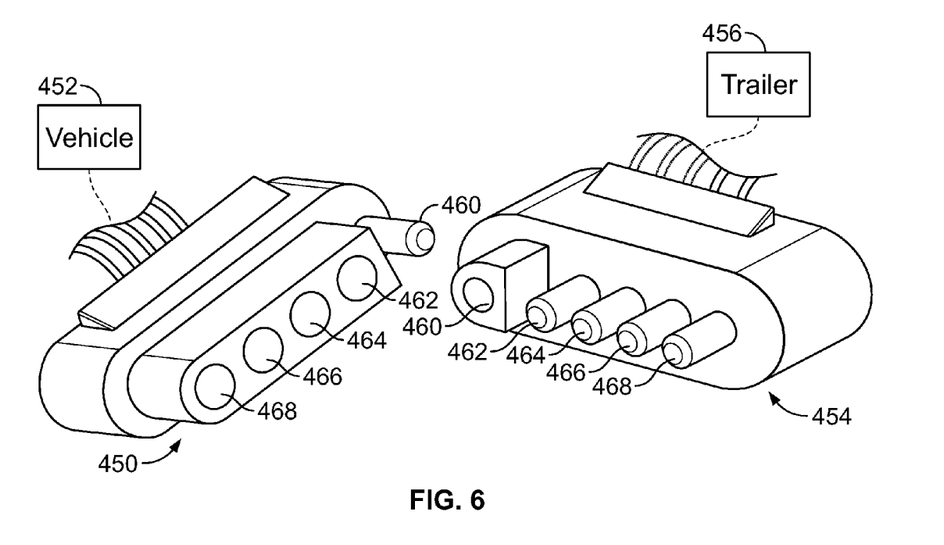
FIGS. 6, 7 and 8 are similar to FIG. 5 and each of the illustrated connectors have a five, six and seven terminal configuration, respectively, in accordance with the present teachings.

With reference to FIG. 6, a connector 450 that connects to a vehicle 452 can connect to a connector 454 that connects to a trailer 456. Each of the connectors 450, 454 can include five terminals: a first terminal 460, a second terminal 462, a third terminal 464; a fourth terminal 466 and a fifth terminal 468. The first terminal 460 can provide for the control of the stop and turn lights on the left side of the trailer 456. The second terminal 462 can provide for the control of the stop and turn lights on the right side of the trailer 456. The third terminal 464 can provide for the running lights on the trailer 456 such as tail lights, license lights and side marker lights. The fourth terminal 466 can provide ground. The fifth terminal 468 can provide auxiliary power. The fifth terminal 468 can be connected to a surge brake mechanism and a signal through the fifth terminal 468 can be used to disable and enable the surge brake mechanism. It will be appreciated in light of the disclosure that the electrical signal from the fifth terminal 468 can be used to illuminate the reverse lights but in this application the signal can be used to enable and disable the surge brake mechanism 20 (FIG. 2).

With reference to FIGS. 2 and 6, the connectors 450 and 454 can be implemented with the vehicle 12 and the trailer 10. The first terminal 460 and the second terminal 462 can provide power to enable and disable the brake lights 24 and the turn lights 26 on the trailer 10. The third terminal 464 can provide power to enable and disable the running lights 22. The fifth terminal 468 can provide power to enable and disable the surge brake mechanism 20. As such, the trailer tow module 54 can turn off the trailer lights 28 and the surge brake mechanism 20 through the connectors 450 and 454.

Figure 7:
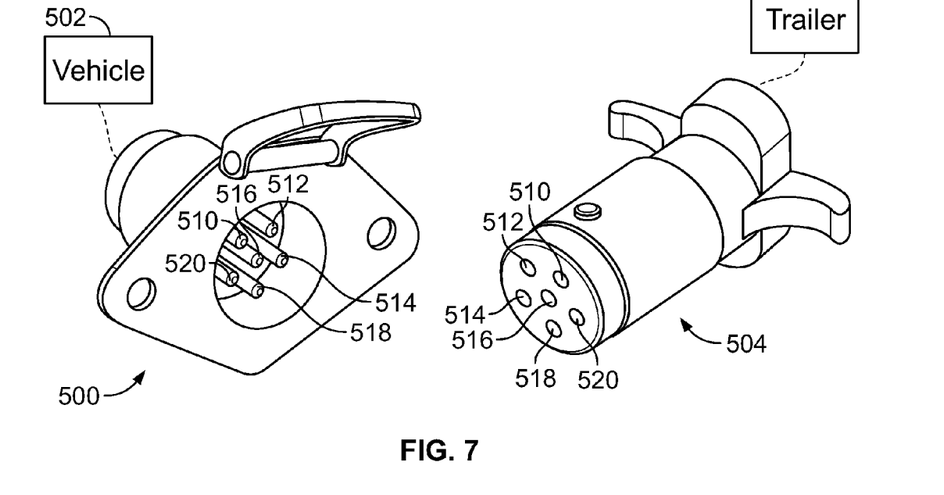

With reference to FIG. 7, a connector 500 can be connected to a vehicle 502 and can connect to a connector 504 that can be connected to a trailer 506. The connectors 500, 504 can have six terminals: a first terminal 510, a second terminal 512, a third terminal 514, a fourth terminal 516, fifth terminal 518 and a sixth terminal 520. The first terminal 510 can provide for tail lights and/or brake lights. The second terminal 512 can provide a signal for an electric brake system on the trailer 506. A third terminal 514 can provide for a right turn signal on a trailer 506. A fourth terminal 516 can provide for an auxiliary 12-volt power source to the trailer 506. A fifth terminal 518 can provide for a left turn light on the trailer 506 and a sixth terminal 520 can provide for the ground. It will be appreciated in light of the disclosure that the electrical signal that can be sent to a surge brake mechanism on the trailer 506 can be done through any of the above terminals. It will also be appreciated in light of the disclosure that the electrical signal can be used to illuminate the reverse lights if so equipped but in this application the signal is used to enable and disable the surge brake mechanism 20 (FIG. 2)

With reference to FIGS. 2 and 7, the connectors 500 and 504 can be implemented with the vehicle 12 and the trailer 10. The first terminal 510 can provide power to enable and disable the brake lights 24 and the running lights 22 on the trailer 10. The second terminal 512 or the fourth terminal 516 can be configured to provide power to enable and disable the surge brake mechanism 20. The third terminal 514 and the fifth terminal 518 can provide power to enable and disable the turn lights 26. As such, the trailer tow module 54 can turn off the trailer lights 28 and the surge brake mechanism 20 through the connectors 500 and 504.

Figure 8:
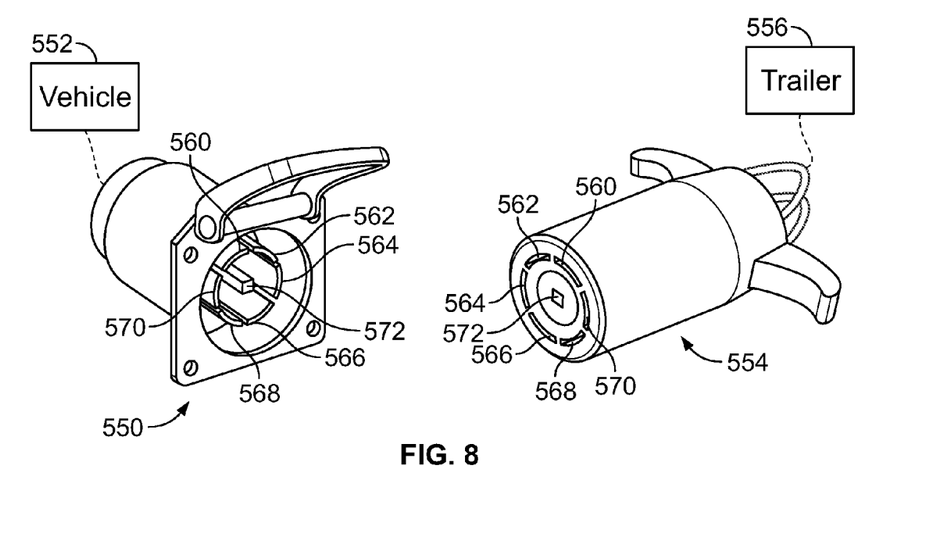

With reference to FIG. 8, a connector 550 can connect to a vehicle 552. A connector 554 can connect to a trailer 556. Each of the connectors 550, 554 can include seven terminals: a first terminal 560, a second terminal 562, a third terminal 564, a fourth terminal 566, a fifth terminal 568, a sixth terminal 570 and a seventh terminal 572. The first terminal 560 can provide for a 12-volt auxiliary power source to the trailer 556. The second terminal 562 can provide for tail lights or brake lights on the trailer 556. The third terminal 564 can provide for a left turn light on the trailer 556. A fourth terminal 566 can provide a ground. A fifth terminal 568 can provide for optional electric brakes on the trailer 556. A sixth terminal 570 can provide for a right turn signal. A seventh terminal 572 can be a dedicated connection for the surge brake mechanism through which the reverse light signal can be sent to the trailer 556. The seventh terminal 572 can also be an auxiliary connection. It will be appreciated in light of the disclosure that the electrical signal from the seventh terminal 572 can be used to illuminate the reverse lights if so equipped but in this application the signal can be used to enable and disable the surge brake mechanism 20 (FIG. 2). It will also be appreciated in light of the disclosure that the electrical signal that can be sent to a surge brake mechanism on the trailer 556 can be done through any of the above terminals.

With reference to FIGS. 2 and 8, the connectors 550 and 554 can be implemented with the vehicle 12 and the trailer 10. The first terminal 560, the fifth terminal 568 or the seventh terminal 572 can be configured to provide power to enable and disable the surge brake mechanism 20. The second terminal 562 can provide power to enable and disable the brake lights 24 and the running lights 22 on the trailer 10. The third terminal 564 and the sixth terminal 570 can provide power to enable and disable the turn lights 26. The third terminal 514 and the fifth terminal 518 can provide power to enable and disable the turn lights 26. As such, the trailer tow module 54 can turn off the trailer lights 28 and the surge brake mechanism 20 through the connectors 500 and 504.

In another example, the first terminal 560 can provide for an electrical signal to charge battery system on the trailer 556 or the trailer 10, as applicable. The second terminal 562 can provide for the electrical signal to enable or disable the surge brake mechanism 20 which would otherwise illuminate reverse lights, if so equipped. The third terminal 564 can provide for running lights on the trailer 556. The fourth terminal 566 can provide for a right turn signal and stop signal. The fifth terminal 568 can provide for a left turn signal and stop signal. The sixth terminal 570 can provide for a ground. The seventh terminal 572 can provide for the enabling, disabling and application of an electric brake that can be used in addition to the surge brake mechanism 20. It will be appreciated in light of the disclosure that the trailer tow module 54 (FIG. 2) need not control the electric brake and the electric brake is generally utilized at speed ranges inapplicable to speed ranges of the vehicle that are associated with the surge brake mechanism. It will also be appreciated in light of the disclosure that the electrical signal that can be sent to a surge brake mechanism on the trailer 556 can be done through any of the above terminals.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect of the present teachings may be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A method of controlling a surge brake mechanism and all lights on a trailer connected to a vehicle that can submerse the trailer to deploy a boat into water, the method comprising:

monitoring the vehicle for vehicle conditions that include at least a speed of the vehicle and a direction in which the vehicle is moving;

waiting for user input from within a passenger compartment of the vehicle that is indicative of a desire to disable all of the lights and the surge brake mechanism on the trailer;

determining a boat launch condition exists when at least one enabling input is detected;

determining the boat launch condition does not exist when any disabling input is detected;

disabling the surge brake mechanism and all of the lights on the trailer, when the boat launch condition exists; and enabling the surge brake mechanism and all of the lights on the trailer, when the boat launch condition does not exist.

2. The method of claim 1, wherein disabling the surge brake mechanism includes maintaining a reverse light signal to the surge brake mechanism on the trailer and wherein enabling the surge brake mechanism includes discontinuing the reverse light signal to the surge brake mechanism.

3. The method of claim 1, wherein the enabling input is only the user input.

4. The method of claim 1, wherein the enabling input is at least one vehicle condition and the user input.

5. The method of claim 4, wherein the at least one vehicle condition defines a speed of the vehicle having a value that is less than a low speed threshold for at least a threshold period.

6. The method of claim 4, wherein the at least one vehicle condition defines a speed of the vehicle having a value that is less than a low speed threshold and a PRNDL status indicates the vehicle is in reverse.

7. The method of claim 6, wherein the low speed threshold is about ten miles per hour and wherein vehicle speed is less than the low speed threshold for about ten seconds.

8. The method of claim 4, wherein the at least one vehicle condition defines a speed of the vehicle having a value between zero and about ten miles per hour for less than a threshold period.

9. The method of claim 1, wherein the user input includes an interaction with a user in the passenger compartment of the vehicle.

10. The method of claim 1, further comprising displaying in the passenger compartment of the vehicle compartment whether the boat launch condition exists.

11. A method of controlling a surge brake mechanism and lights on a trailer connected to a vehicle, the method comprising:

monitoring the vehicle for at least one vehicle condition;

waiting for user input from within a passenger compartment of the vehicle;

determining whether a boat launch condition exists based on at least one of the user input and the vehicle condition;

disabling the surge brake mechanism and all of the lights on the trailer, when the boat launch condition exists; and enabling the surge brake mechanism and all of the lights on the trailer, when the boat launch condition does not exist.

12. The method of claim 11, wherein disabling the surge brake mechanism includes maintaining a reverse light signal to the surge brake mechanism on the trailer and wherein enabling the surge brake mechanism includes discontinuing the reverse light signal to the surge brake mechanism.

13. The method of claim 11, wherein the user input is indicative of a desire of a user to disable all of the lights and the surge brake mechanism on the trailer.

14. The method of claim 13, wherein the boat launch condition exists when an enabling input is detected and no disabling input is detected and wherein the enabling input is only the user input.

15. The method of claim 13, wherein the boat launch condition exists when enabling input is detected and no disabling input is detected and wherein the enabling input is at least one vehicle condition and the user input.

16. The method of claim 15, wherein the at least one vehicle condition defines a speed of the vehicle having a value that is less than a low speed threshold for at least a threshold period.

17. The method of claim 15, wherein the at least one vehicle condition defines a speed of the vehicle having a value that is less than a low speed threshold and a PRNDL status indicates the vehicle is in reverse.

18. The method of claim 17, wherein the low speed threshold is about ten miles per hour and wherein vehicle speed is less than the low speed threshold for about ten seconds.

19. The method of claim 15, wherein the at least one vehicle condition defines a speed of the vehicle having a value between zero and about ten miles per hour for less than a threshold period.

20. The method of claim 11, further comprising displaying in the passenger compartment of the vehicle whether the boat launch condition exists.

* * * * *